US011403531B2

United States Patent
Carr et al.

(10) Patent No.: US 11,403,531 B2
(45) Date of Patent: Aug. 2, 2022

(54) FACTORIZED VARIATIONAL AUTOENCODERS

(71) Applicant: Disney Enterprises, Inc., Burbank, CA (US)

(72) Inventors: G. Peter K. Carr, Allison Park, PA (US); Zhiwei Deng, Vancouver (CA); Rajitha D. B Navarathna, Pittsburgh, PA (US); Yisong Yue, Glendale, CA (US); Stephan Marcel Mandt, Pittsburgh, PA (US)

(73) Assignee: Disney Enterprises, Inc., Burbank, CA (US)

( * ) Notice: Subject to any disclaimer, the term of this patent is extended or adjusted under 35 U.S.C. 154(b) by 1144 days.

(21) Appl. No.: 15/654,529

(22) Filed: Jul. 19, 2017

(65) Prior Publication Data

US 2019/0026631 A1    Jan. 24, 2019

(51) Int. Cl.
- *G06N 3/08* (2006.01)
- *G06F 17/16* (2006.01)
- *G06N 3/04* (2006.01)

(52) U.S. Cl.
CPC ........... *G06N 3/088* (2013.01); *G06F 17/16* (2013.01); *G06N 3/0454* (2013.01); *G06N 3/0472* (2013.01); *G06N 3/084* (2013.01)

(58) Field of Classification Search
CPC ...... G06N 3/088; G06N 3/0472; G06N 3/084; G06F 17/16
See application file for complete search history.

(56) References Cited

U.S. PATENT DOCUMENTS

| 6,507,353 B1 * | 1/2003 | Huard ............... G06F 3/011 345/419 |
| 8,498,949 B2 | 7/2013 | Huh et al. |
| 8,848,006 B2 | 9/2014 | Wetzstein et al. |
| 9,324,022 B2 | 4/2016 | Williams, Jr. et al. |

(Continued)

FOREIGN PATENT DOCUMENTS

WO    2015127394 A1    8/2015

OTHER PUBLICATIONS

Liu et al., "Tensor Decomposition via Variational Auto-Encoder", Association for the Advancement of Artificial Intelligence, (Nov. 2016). (Year: 2016).*

(Continued)

*Primary Examiner* — Alexey Shmatov
*Assistant Examiner* — Beatriz Ramirez Bravo
(74) *Attorney, Agent, or Firm* — Patterson + Sheridan, LLP

(57) ABSTRACT

The disclosure provides an approach for learning latent representations of data using factorized variational autoencoders (FVAEs). The FVAE framework builds a hierarchical Bayesian matrix factorization model on top of a variational autoencoder (VAE) by learning a VAE that has a factorized representation so as to compress the embedding space and enhance generalization and interpretability. In one embodiment, an FVAE application takes as input training data comprising observations of objects, and the FVAE application learns a latent representation of such data. In order to learn the latent representation, the FVAE application is configured to use a probabilistic VAE to jointly learn a latent representation of each of the objects and a corresponding factorization across time and identity.

23 Claims, 5 Drawing Sheets

(56) References Cited

U.S. PATENT DOCUMENTS

| | | | |
|---|---|---|---|
| 2013/0254287 A1* | 9/2013 | Biswas | H04L 51/32 709/204 |
| 2014/0201126 A1 | 7/2014 | Zadeh et al. | |
| 2014/0223462 A1 | 8/2014 | Aimone et al. | |
| 2015/0339680 A1* | 11/2015 | Takahashi | G06Q 30/0201 705/7.29 |
| 2016/0019434 A1* | 1/2016 | Caldwell | G06K 9/4671 345/474 |
| 2016/0292589 A1 | 10/2016 | Taylor, Jr. et al. | |
| 2017/0206464 A1* | 7/2017 | Clayton | G06N 3/0445 |
| 2017/0213134 A1* | 7/2017 | Beyeler | G06K 9/6249 |
| 2017/0372193 A1* | 12/2017 | Mailhe | G06N 3/0472 |
| 2018/0204354 A1* | 7/2018 | Kimura | G06F 16/5838 |
| 2018/0365874 A1* | 12/2018 | Hadap | G06N 3/0454 |
| 2019/0220691 A1* | 7/2019 | Valpola | G06N 3/02 |

OTHER PUBLICATIONS

Habibie et al., "A Recurrent Variational Autoencoder for Human Motion Synthesis" (Jan. 2017). (Year: 2017).*

Kingma et al., "Auto-Encoding Variational Bayes", Proceedings of the International Conference on Learning Representations (ICLR), 2014. (Year: 2014).*

Zhe et al., "Scalable Nonparametric Multiway Data Analysis", (Aistats)(2015). (Year: 2015).*

An et al., "Variational Autoencoder based Anomaly Detection using Reconstruction Probability", SNU Data Mining Center, 2015 (Year: 2015).*

Pu et al., Variational Autoencoder for Deep Learning of Images, Labels and Captions, NIPS, 2016. (Year: 2016).*

Bayarri et al., "Bayesian Nonparametric Latent Feature Models", Oxford Univiersity Press, 2007 (Year: 2007).*

Maehara et al., "Expected Tensor Decomposition with Stochastic Gradient Descent", AAAI, 2016. (Year: 2016).*

Marcheggiani et al., "Discrete-State Variational Autoencoders for Joint Discovery and Factorization Relations", Transactions of the Association for computational Linguistics, vol. 4, 2016. (Year: 2016).*

Taylor et al., "Factored Conditional Restricted Boltzmann Machines for Modeling Motion Style", Proceedings of the 26th International Conference on Machine Learning, 2009. (Year: 2009).*

Bin Dai et al., "Veiled Attributes of the Variational Autoencoder", (Jun. 16, 2017) (Year: 2017).*

Liu et al., "Tensor Decomposition via Variational Auto-Encoder," Association for the Advancement of Artifical Intelligence, Nov. 3, 2016, 8 pages.

Zhe et al., "Distributed Flexible Nonlinear Tensor Factorization," 30th Conference on Neural Information Processing Systems (NIPS 2016), 9 pages.

Sonderby et al. "Ladder Variational Autoencoders," 30th Conference on Neural Information Processing Systems (NIPS 2016), 9 pages.

Eleftheriadis et al., "Variational Gaussian Process Auto-Coder for Ordinal Predicition of Facial Action Units," Department of Computingm, Imperial College London, Aug. 16, 2016, 16 pages.

Int8, "Variational Autoencoder in Tensorflow-facial expression low dimensiional embedding," Dec. 12, 2016, 9 pages.

Nakamura et al., "Nonlinear transformation of tensor factorization for collaborative filtering," 21st Annual Conference of the Japanese Neural Network, Dec. 2011, 2 pages.

* cited by examiner

FACTORIZED VARIATIONAL AUTOENCODERS

BACKGROUND

Field of the Invention

Embodiments of the disclosure presented herein relate to unsupervised machine learning and, more specifically, to factorized variational autoencoders.

Description of the Related Art

In unsupervised machine learning, inferences are made from input data that are not labeled. Matrix and tensor factorization techniques have been used in unsupervised machine learning to find underlying patterns from noisy data. In particular, such factorization techniques can be applied to identify an underlying low-dimensional representation of latent factors in raw data. However, when the relationship between the latent representation to be learned and the raw data is complex, such as the behavior of a forest of trees in response to wind in a physical simulation or the reactions of an audience viewing a movie, the data may not linearly decompose into a set of underlying factors as required by conventional matrix and tensor factorization techniques. As a result, such techniques may not achieve good reconstructions of training data or produce interpretable latent factors in complex domains.

SUMMARY

One embodiment provides a computer-implemented method for determining latent representations from data. The method generally includes receiving data associated with observations of one or more objects. The method further includes learning, from the received data, a variational autoencoder, the learning being subject to at least a constraint that outputs of an encoder of the variational autoencoder are able to be factorized.

Further embodiments provide a non-transitory computer-readable medium that includes instructions that, when executed, enable a computer to implement one or more aspects of the above method, and a computer system programmed to implement one or more aspects of the above method.

BRIEF DESCRIPTION OF THE DRAWINGS

So that the manner in which the embodiments disclosed herein are attained and can be understood in detail, a description of embodiments of this disclosure may be had by reference to the appended drawings.

It is to be noted, however, that the appended drawings illustrate only typical embodiments and are therefore not to be considered limiting of its scope, for this disclosure may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Figure 1:
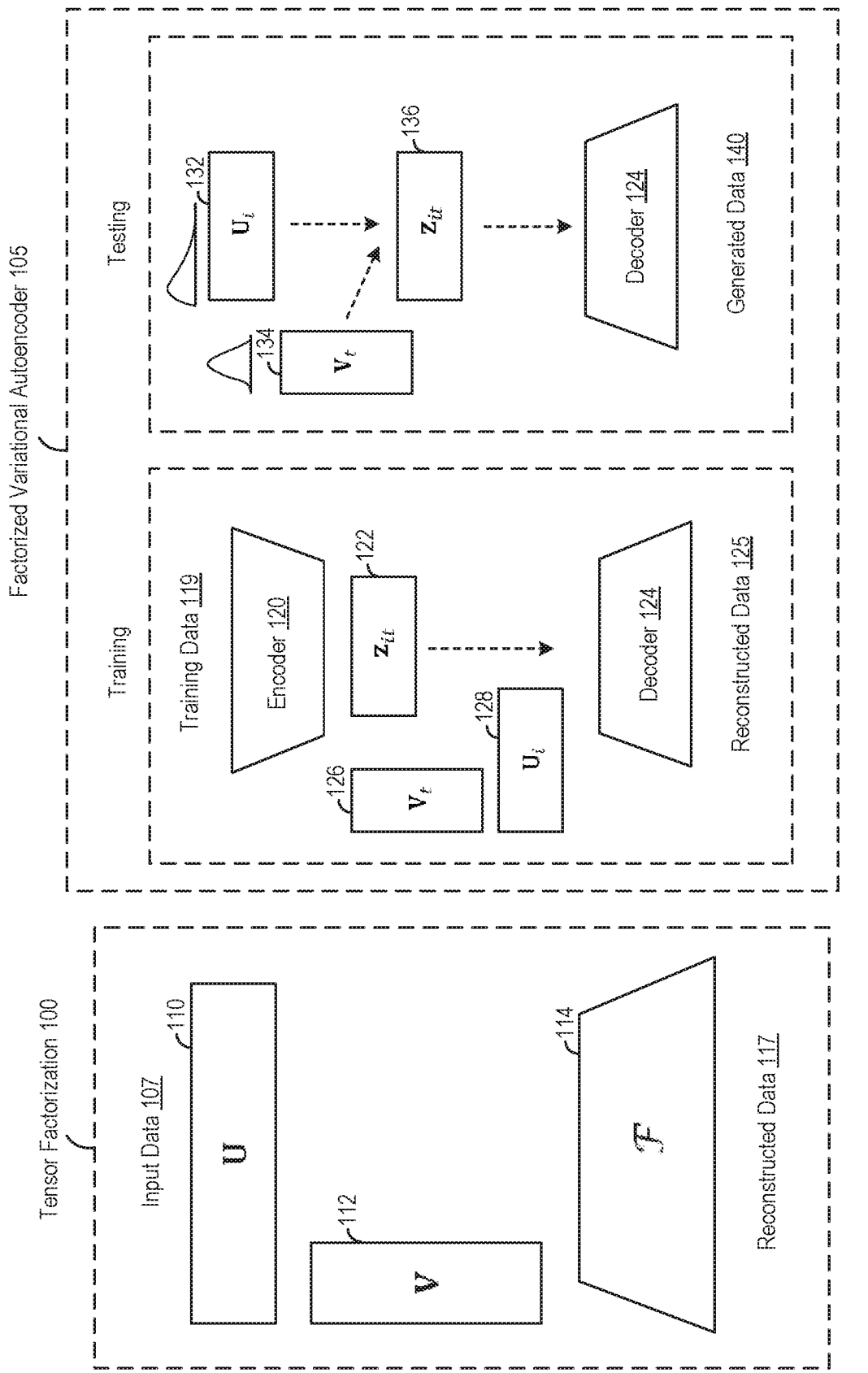
FIG. 1 illustrates a traditional tensor factorization approach and a factorized variational autoencoder framework, according to an embodiment.

Embodiments of the disclosure presented herein provide approaches for learning latent representations of data using factorized variational autoencoders (FVAEs), which overcome the problem of data that does not linearly decompose into factors by effectively searching for an underlying low-dimensional representation such that the transformed data are amenable to linear factorization. The learned latent representation may provide insight into phenomena hidden inside the data, and FVAEs may also be used in numerous applications such as de-noising, imputing missing values, and reducing label complexity for training supervised learning approaches, among other things. The FVAE framework builds a hierarchical Bayesian matrix factorization model on top of a variational autoencoder (VAE) by learning a VAE that has a factorized representation, referred to herein as a factorized VAE or FVAE, so as to further compress the VAE's embedding space and enhance generalization and interpretability. The hierarchical model expresses an object observed at a given time in a multi-step probabilistic generative process. First, a vector of latent stimuli is generated which is the same for all objects, along with another vector of object affinities, representing how much a particular object reacts to these stimuli, and expressing how these reactions are similar to various typical types of reactions among the other objects. These two vectors are multiplied to generate a latent representation of the reaction, thus producing a latent code that encodes information about the object at the given time. Finally, this latent representation can be decoded through a neural network to represent the observed data. The corresponding model parameters are learned by means of approximate Bayesian inference. The latent variable that encodes information may also be decoded to regenerate the observed object at the given time by inputting the latent variable into a decoder of the FVAE.

In one embodiment, an FVAE application takes as input training data comprising observations of objects and learns a latent representation of such data. For example, the observations may include the behavior of a forest of trees in a physical simulation or the reactions of an audience viewing a movie, as depicted in frames of a video. The goal may then be to learn latent stimuli such as wind or humorous scenes that produce the observed behavior of the forest or the audience reactions, respectively, as well as latent properties of the objects themselves such as a predisposition of a particular tree to sway in response to wind or a particular audience member to laugh when viewing a humorous scene. In order to learn the latent representation of the data, the FVAE application is configured to use a probabilistic VAE to jointly learn a latent representation of each object and a corresponding factorization across time and identity. That is, learning of the VAE is subject to a constraint that outputs of the VAE's encoder are able to be factorized. This formulation is a non-linear variant of tensor factorization that inherits the generalization power of tensor factorization in exploiting known assumptions of the data (e.g., the signal factorizes across objects and time) while also inheriting the flexibility of deep learning to discover complex non-linear relationships between the latent representation and the raw data. As a result, FVAEs enable compact and accurate modeling of complex data that was not possible with either variational autoencoders or tensor factorization alone. In summary, the FVAE application receives observed data (e.g., in the form of a three-dimensional tensor) and learns a compressed representation of the data in a low-dimensional embedding space using a probabilistic neural network architecture, with the compressed representation being factorized (e.g., in two of the three dimensions for the three-dimensional tensor). The FVAE application may also compress the data further and generalize to unseen data points.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., an FVAE application) or related data available in the cloud. For example, the FVAE application could execute on a computing system in the cloud. In such a case, the FVAE application could receive training data comprising observations of objects and learns a latent representation of such data and generate new data, among other things, and store the latent representation or generated data at a storage location in the cloud. Doing so allows a user to access this information from any computing system attached to a network connected to the cloud (e.g., the Internet).

Referring now to FIG. 1, a traditional tensor factorization approach 100 and a factorized variational autoencoder framework 105 according to an embodiment is shown. Traditional tensor factorization relies on data decomposing linearly, whereas the FVAE is a non-linear variant of tensor factorization using variational autoencoders to learn a factorized non-linear embedding of data. It is assumed that the objects have correlated reactions (e.g., the motion of trees in a forest in response to wind or the reaction of an audience to a movie tend to be correlated), and it can be further assumed that there are underlying exemplar behaviors (e.g., laughing or smiling of an audience member or swaying of a tree) which form a basis to reconstruct the observed reaction of each object. If N objects are observed for a duration of T frames, then, for each object i at time t, a D dimensional vector $x_{it} \in \mathbb{R}^D$ may be used to represent the observations (or sensor data), such as (x,y) locations of landmarks on the object i. As described in greater detail below, landmarks may include, e.g., the trunks, branches, etc. of trees in the case of a physical simulation of a forest or the contours of audience members' jaws and mouths, noses, eyes, etc. in the case of audience reactions to a movie, and these landmarks may be detected using, e.g., computer vision algorithms. Although the example of landmarks is described in some places, it should be understood that techniques disclosed herein may also be applied to non-landmark data. For example, the non-landmark data may include the strain within tree branches, the heart rate of audience members, etc. As subsets of the objects may be expected to react in similar ways to stimuli, the FVAE application in one embodiment identifies patterns across time in a N×T×D tensor X representing locations of landmarks on the N objects in T frames (of a video). In the tensor X, each row represents a particular audience member, each column represents a particular time (e.g., a frame of a video), and the third dimension depth represents (x,y) locations of landmarks on objects. It should be understood that the tensor X may have missing entries if, e.g., landmarks are occluded and cannot be identified for some objects at some time instances.

As shown in panel A, traditional tensor factorization 100 is a technique for identifying an underlying low-dimensional representation of K latent factors in which input data 107, such as the tensor X described, above may be factorized into matrices $U \in \mathbb{R}^{N \times K}$ 110, $V \in \mathbb{R}^{T \times K}$ 112, and $F \in \mathbb{R}^{D \times K}$ 114 such that:

$$x_{it} = (U_i \circ V_t) F^T, \quad (1)$$

where $\circ$ denotes the Hadamard product, $U_i \in \mathbb{R}^K$ and $V_t \in \mathbb{R}^K$ are latent factors corresponding to object i and time t, respectively, and F represents latent factors for observations (e.g., landmarks). That is, any element in the tensor X is a product of a row of matrix U, a row of matrix V, and a row of matrix F, and the tensor X may be recovered as reconstructed data 117 via such a product. This factorization is also known as the PARAFAC decomposition. Intuitively, each latent dimension k=1, . . . , K in the tensor factorization may correspond to a distinct archetype of how objects react to stimuli. For example, each column of the V matrix 112 represents the time series motion associated with a particular archetype. This motion profile may be used to modulate the latent spatial factors F to generate, e.g., locations of landmarks for a particular time instant. The matrix U 112 encodes the affinity of particular objects to each archetype. That is, each element $U_{ik}$ of the matrix U 112 encodes how well the reaction of object i is described by archetype k. Further, non-negativity U>0 may be enforced in order to encourage interpretability. For example, $V_t$ may encode typical reactions of different types of audience members (one type of person might laugh, another type of person might smirk, etc.) to a movie at a given time, and $U_i$ may encode how audience member i's reactions are similar to each of the types of audience members, with the Hadamard product of the vector of properties of the audience member $U_i$ and the vector of the typical reactions $V_t$ (i.e., $U_i \circ V_t$) producing a weighted combination of the typical reactions that is a latent variable encoding information about the object at the given time. This weighted combination may further be multiplied by a row of the matrix F representing latent spatial factors for landmarks to generate the facial landmarks (e.g., an open mouth for laughing) associated with audience member i.

A key limitation of traditional tensor factorization is that underlying patterns in the data are modeled as a linear combination of latent factors. For modeling complex processes, this linear assumption could lead to poor reconstructions and generalizations. A non-linear version of probabilistic tensor factorization that combines tensor factorization with deep learning in a straightforward manner may include drawing $U_i \sim \ln \mathcal{N}(0, I)$ from a log-normal prior that ensures positivity of the latent matrix U, $V_t \sim \mathcal{N}(0, I)$ from a Gaussian prior, and the observations $\mathcal{N}(f_\theta(U_i \circ V_t), I)$, where $f_\theta$ is a deep neural network. It should be understood that the matrix F of traditional tensor factorization is replaced with the output of a neural network which performs a non-linear transformation on the latent factorized code. For inference in such non-linear tensor factorization, the latent variables may be replaced by point estimates according to the maximum a posteriori (MAP) approximation, such that the Gaussian priors become quadratic regularizers and the objective to maximize is:

$$\mathcal{L}(U,V,\theta) = \log p_\theta(x|U,V) + \log p(U) + \log p(V) = \Sigma_{it} \|x_{it} - f_\theta(U_i \circ V_t)\|_2^2 + \Sigma_i \|U_i\|_2^2 + \Sigma_t \|V_t\|_2^2 \quad (2)$$

However, experience has shown that this straightforward combination of tensor factorization with deep learning does not provide the flexibility to properly model some object behaviors. In other words, even after the nonlinear transformation induced by the neural network, the data may not be amenable to linear factorization.

Panel B shows a factorized variational autoencoder (FVAE) framework 105 that solves the problems with linear tensor factorization and the straightforward combination of tensor factorization with deep learning discussed above. The FVAE framework builds a hierarchical prior model on top of a variational autoencoder (VAE) to combine the concepts of tensor factorization and VAEs. A VAE is a generative latent variable model that embeds each vector $x_{it}$ separately into a K-dimensional latent space. Similar to the straightforward combination of tensor factorization with deep learning, in the FVAE model, the matrix F representing latent spatial factors discussed above is replaced with a neural network that is a non-linear transform. Such a neural network is also referred to herein as the "decoder" 124 which takes a product of U and V and regenerates a tensor (that resembles observed data X). In order to learn such a decoder, a non-linear transform may be applied to training data 119, such as data in form of the tensor X, to get it into a space where regular matrix factorization can be performed. The encoder 120 is a neural network that performs such a non-linear transform to compress an element of the input tensor X into a lower-dimensional vector 112 of latent factors Z and predicts associated uncertainties. When learning the VAE, a constraint is enforced that any Z generated by the encoder must factor into vectors U 128 and V 126, i.e., that the output of the encoder factorizes. This permits generalization (e.g., to unobserved or missing data) like matrix factorization, which a traditional VAE's encoding of individual objects could not achieve. The learning process itself fits the input data from tensor X to the model to find hidden parameters U, V, and Z and corresponding neural network parameters. Illustratively, the output of the encoder 120, namely the vector Z 122 which factors into vectors U 128 and V 126, can be input into the decoder 124 to generate reconstructed data 125 similar to the input observations representing, e.g., the locations of landmarks on objects. Further, the FVAE is a generative model that can be used produce new data. As shown, the FVAE application may also generate such new data 140 in one embodiment by drawing a $U_i$ vector 132 and a $V_t$ vector 134 from, e.g., the standard log-normal and Gaussian priors, respectively, and then pushing the Hadamard product $U_i \circ V_t$ which gives the $Z_{it}$ vector 136 through the decoder 124.

More formally, the VAE's stochastic generative process involves drawing a latent variable $z_{it} \in \mathbb{R}^K$ from a uniform prior distribution $p(z_{it}) = \mathcal{N}(0,I)$, pushing the result through a decoder network $f_\theta(\bullet)$ with network parameters $\theta$, and adding Gaussian noise. In other words, the likelihood may be modeled as $p_\theta(x|z) = \Pi_{i,t} \mathcal{N}(f_\theta(z_{it}),I)$, where I is the identity matrix. It should be understood that use of a neural network for this likelihood function permits more flexibility in fitting training data. In particular, the VAE generative process is:

$$\forall_{i,t} : z_{it} \sim \mathcal{N}(0,I), x_{it} \sim \mathcal{N}(f_\theta(z_{it}),I). \quad (3)$$

In one embodiment, the FVAE framework includes learning the following Bayesian posterior distribution over latent variables:

$$p_\theta(z|x) = p_\theta(x|z)p(z)/p_\theta(x), \quad (4)$$

which has an intractable normalization $p_\theta(x)$. In such a case, the FVAE application may use variational inference to approximate the posterior distribution using a variational distribution $q_\lambda(z|x) = \Pi_{i,t} \mathcal{N}(\mu_\lambda(x_{it}), \Sigma_\lambda(x_{it}))$. Here, $\mu_\lambda(\bullet)$ and $\Sigma_\lambda(\bullet)$ are neural networks (encoders) with parameters $\lambda$, which are referred to herein as "variational parameters" and which are optimized to minimize KL divergence between $p_\theta(z|x)$ and $q_\lambda(z|x)$. The model (decoder) parameters $\theta$ are also simultaneously optimized. That is, Bayesian inference is used to learn (infer) these hidden parameters. It can be shown that this optimization is equivalent to maximizing the following variational objective, which does not depend on $p_\theta(x)$:

$$\mathcal{L}(\theta,\lambda) = \mathbb{E}_q[\log p_\theta(x|z)] + KL((z|x)\|p(z)). \quad (5)$$

Note that the expectation can be carried out numerically by sampling from q in each gradient step.

Traditional VAEs can learn a compact encoding of raw data, which can then lead to low reconstruction error. However, VAEs cannot relate different objects' behaviors or a single object's behavior at different times. For example, VAEs cannot be used to impute missing values when an object is not tracked at all times, which prohibits VAEs from being used in many prediction tasks. The FVAE, such as that shown in panel B, solves this problem with traditional VAEs by effectively capturing collective effects in data. In one embodiment, the FVAE model jointly learns a non-linear encoding $z_{it}$ for each set of observations for an object at a given time $x_{it}$, and jointly carries out a factorization in z. In contrast to the non-linear tensor factorization baseline, the FVAE includes both local and global latent variables, which makes the FVAE able to learn more refined encodings. As such, the FVAE enables sharing of information across objects while simultaneously taking into account the non-linearities of object behaviors.

After drawing $U_i$ from the standard log-normal and $V_t$ from Gaussian priors, $z_{it} \sim \mathcal{N}(U_i \circ V_t, I)$ and $x_{it} \sim \mathcal{N}(f_\theta(z_{it}), I)$ can be drawn. In contrast to the non-linear tensor factorization baseline described above, the hard constraint $z_{it} = U_i \circ V_t$ is replaced with a soft constraint in one embodiment by adding Gaussian noise. As $U_i$ and $V_t$ are global, they may be MAP-approximated, leading to the objective:

$$\mathcal{L}(\theta,\lambda,U,V) = \mathbb{E}_q[\log p_\theta(x|z)] + KL(q_\lambda(z|x) \| \mathcal{N}(U \circ V, I)) + \log p(U) + \log p(V). \quad (6)$$

Intuitively, the FVAE jointly learns an autoencoder embedding of the $x_{it}$'s while also learning a factorization of the embedding. To see this, fix the embeddings $z \equiv z^*$, and then the remaining non-constant parts of the objective are $\mathcal{L}(U,V|z^*) = \log \mathcal{N}(z^*; U_i \circ V_t, I) + p(U) + p(V)$, which is just a factorization of the embedding space. Rather than a simple normal Gaussian prior for z, the FVAE prior is a probabilistic factorization model with global parameters U and V and log-normal and normal hyperpriors, respectively.

Figure 2:
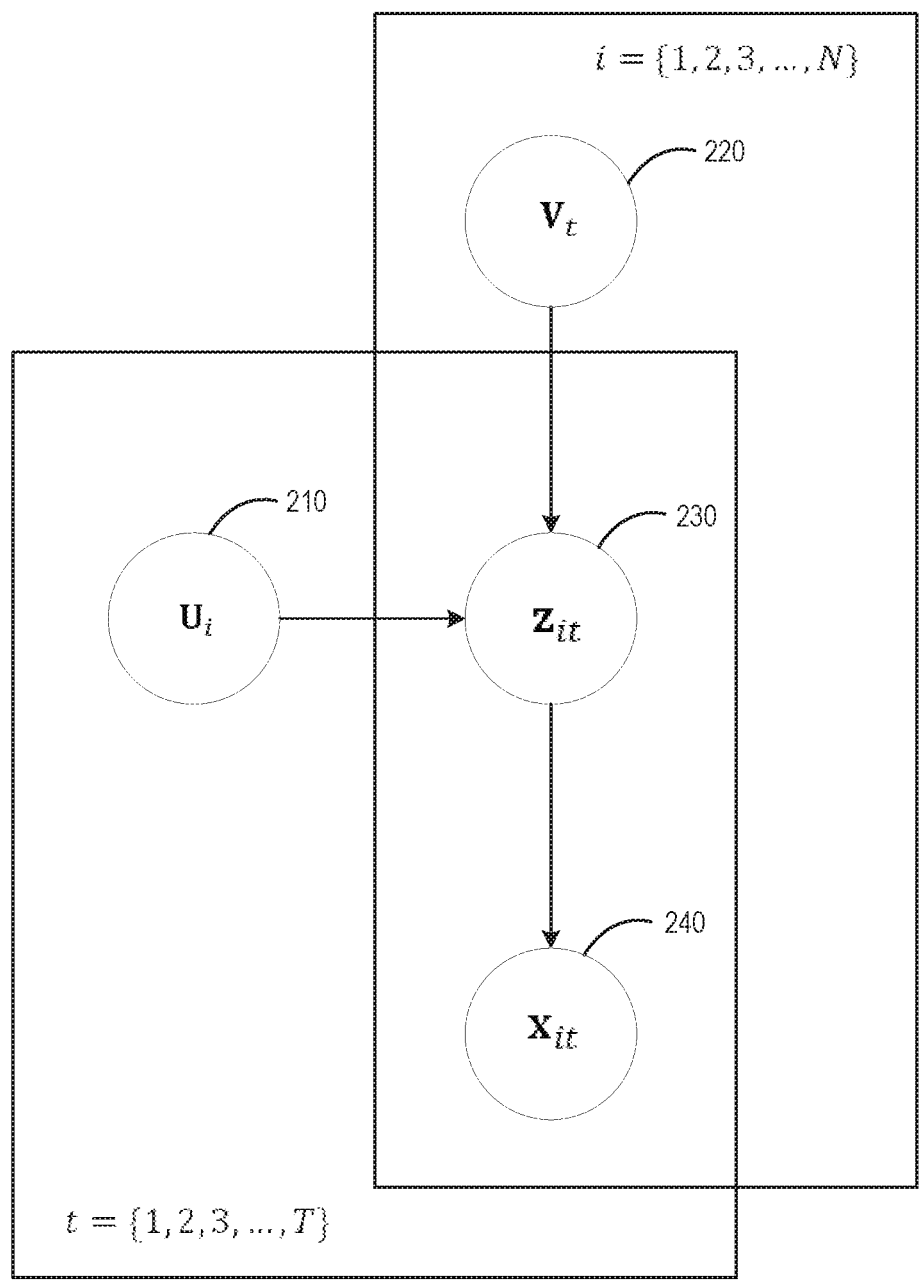
FIG. 2 illustrates a graphical model depiction of the factorized variational autoencoder, according to an embodiment.

FIG. 2 illustrates a graphical model depiction of the factorized variational autoencoder, according to an embodiment. As shown, to perform prediction/matrix completion, the FVAE application takes as input a $U_i$ vector 210 and a $V_t$ vector 220, which are the latent factors corresponding to object i and time t, and computes the Hadamard product $U_i \circ V_t$ to give the corresponding latent factor $z_{it}$ vector 230. The FVAE application may then predict the output (e.g., missing data) by pushing $z_{it}$ into the FVAE decoder, giving an $x_{it}$ vector 240 representing, e.g., landmarks on an object. As described in greater detail below, the FVAE may also be used for a number of other predictive tasks, such as predicting missing data, predicting behaviors of an object given a subset of observations, analyzing group behavior, de-noising, and reducing label complexity for training supervised learning approaches among other things.

As the FVAE is a generative model, it is also capable of producing new data. In one embodiment, the FVAE application may generate such new data by drawing the vector $U_i$ 210 and the vector $V_t$ 220 from the standard log-normal and Gaussian priors, respectively, that are discussed above and then pushing the Hadamard product $U_i \circ V_t$ through the decoder. For example, in the case of a physical simulation of a forest of trees (or any other object such as actors), the FVAE application may learn the latent properties and latent stimuli for a small number of trees (or other objects) such as the wind that makes the trees shake, and the FVAE application may then sample other trees (or objects) and use the sampling to complete a scene, such as a scene of the forest. Doing so avoids an expensive physical simulation of the entire forest.

Figure 3:
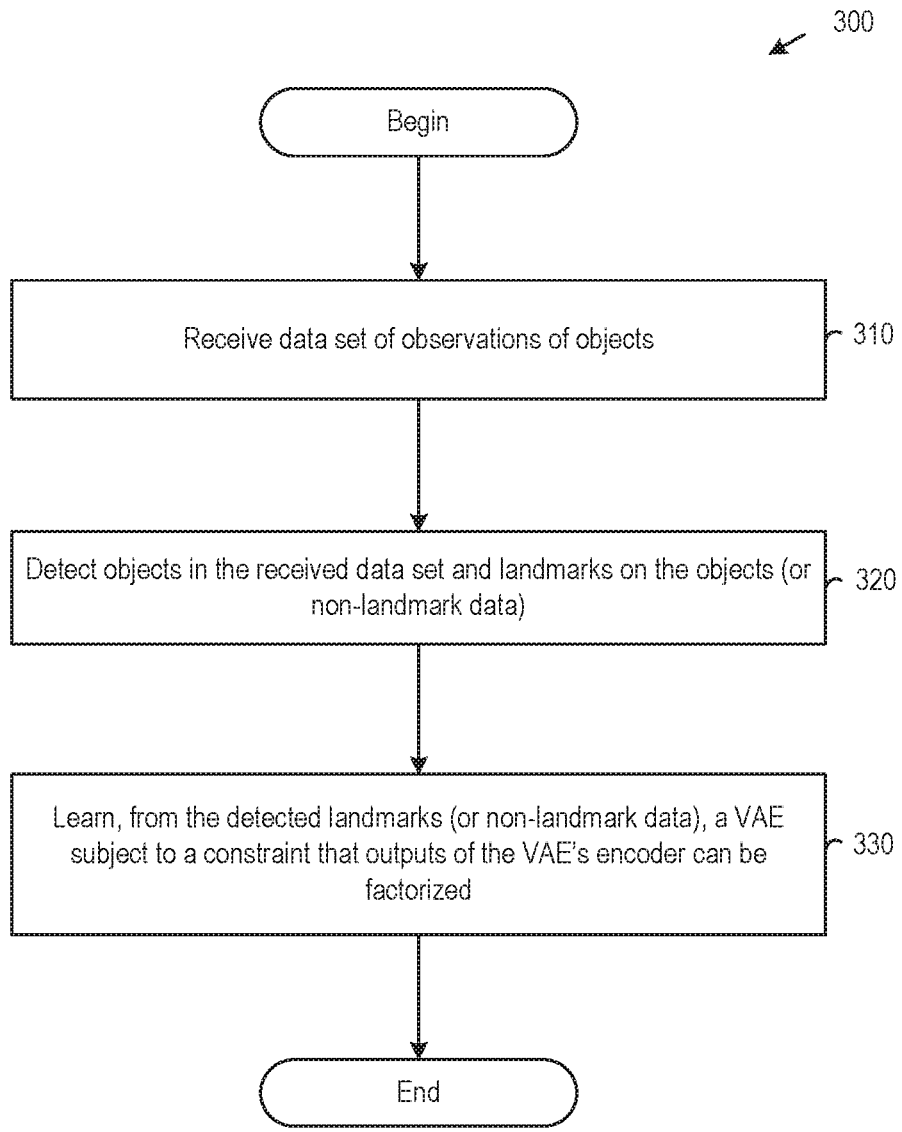
FIG. 3 illustrates a method for determining latent representations from raw data, according to an embodiment.

FIG. 3 illustrates a method 300 for determining latent representations from raw data, according to an embodiment. As shown, the method 300 begins at step 310, where an FVAE application receives a data set of observations of objects. For example, the data set may include video frames depicting the behavior of a forest of trees in a physical simulation or the reactions of an audience viewing a movie.

At step 320, the FVAE application detects objects in the received data set and landmarks on the objects (or, alternatively, non-landmark data). Any feasible computer vision algorithm may be used to detect the objects and landmarks on the objects. For example, the Max Margin Object Detection (MMOD) technique, which learns a Histogram of Oriented Gradients (HoG) template on training images using structural support vector machines, may be used, along with manually labeled training images. Then, after objects are detected, an ensemble of regression trees (ERT) may be used to detect landmarks on the objects, such as the trunks, branches, etc. of trees in the case of a physical simulation of a forest or the contours of audience members' jaws and mouths, noses, eyes, etc. in the case of captured audience reactions to a movie. It should be understood that additional processing may also be performed, such as associating the detected jaws and mouths, noses, eyes, etc. with a 3D face mesh and generating a frontalized view through a rotation to capture information such as overall face shape and instantaneous expression.

At step 330, the FVAE application learns, from the detected landmarks (or non-landmark data), a VAE subject to a constraint that outputs of the VAE's encoder can be factorized. The factorized representation compresses the embedding space of the VAE and enhances generalization and interpretability. In one embodiment, learning of the VAE with the factorized representation may include jointly learning a latent representation of each object and a corresponding factorization across time and object identity. As described, such learning may involve learning an approximation to the Bayesian posterior distribution of equation (4) over latent variables, which may include initializing the encoder and decoder neural networks of the VAE (e.g., to random values) and using a backpropagation technique to update the states of the neural networks until a loss function is minimized.

Experience has shown that the learning of the VAE with the factorized representation can produce learned representations capturing semantically interesting concepts. For example, in the case of audience members viewing a movie, the learned representation may include a latent factor resembling smiling, which includes landmarks forming upwards curved deformations of the mouth without opening, and another latent factor resembling laughing which includes landmarks forming an open mouth. Experience has shown that such latent factors can be semantically meaningful, as the smiling/laughing components tend to correlate with significant moments in movies.

The learned latent representations can in turn be used for a wide range of predictive tasks. For example, the learned FVAE may be used to predict missing data, predict behaviors of an object given a subset of observations, and analyze group behavior, among other things. In one embodiment, the FVAE may predict missing data by taking as inputs $U_i$ and $V_t$, which are the latent factors corresponding to object i and time t, computing the Hadamard product $U_i \circ V_t$ to give the corresponding latent factor $z_{it}$, and then pushing $z_{it}$ into the FVAE decoder. In another embodiment, the FVAE application may predict behaviors of an object given a subset of observations (e.g., reactions of an audience member to a few seconds/minutes of observations of the audience member watching the movie) by estimating values of $U_i$ using the subset of observations and taking the Hadamard product $U_i \circ V_t$ to generate a predicted set of facial landmarks $\{x_{i1}, \ldots, x_{it}\}$ for an individual across the entire movie. In a further embodiment, the FVAE application may analyze group behaviors such as correlated behaviors of objects by clustering rows of U to identify objects that exhibit similar behaviors. Experience has shown that in the case of an audience watching a movie, clustering may be performed across the smiling and laughing dimensions, as clustering across all dimensions may lead to over-segmentation (e.g., people who exhibit similar dynamic face expressions may be partitioned based on different rigid face shapes). In yet other embodiments, the FVAE may be used in de-noising by filling in missing data to get rid of high frequency jitter, to reduce label complexity for training supervised learning approaches (e.g., data mining) by compressing data to lower-dimensional latent representations, or to detect anomalies such as clusters of objects that do not have strong correlations with any factors.

Figure 4:
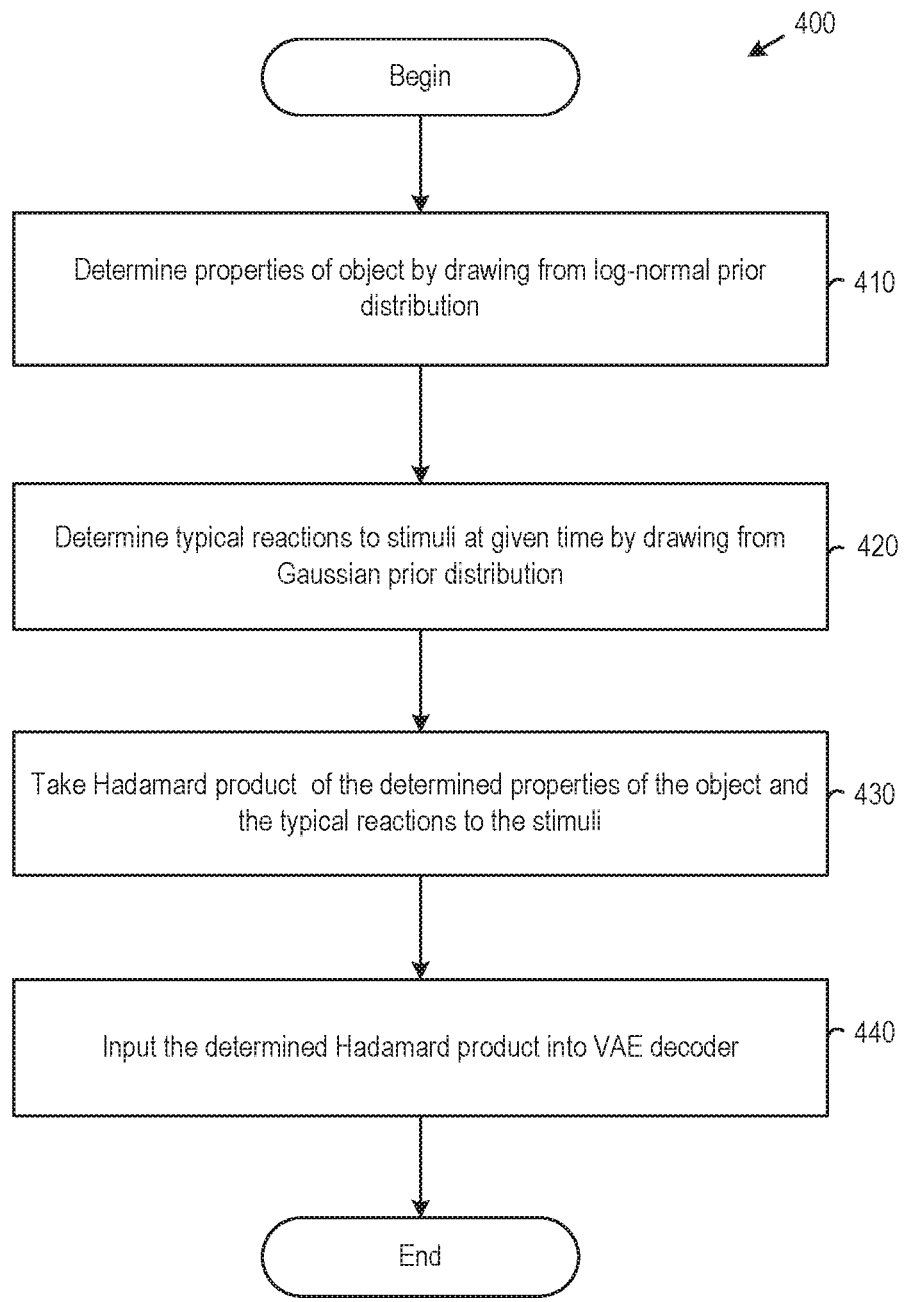
FIG. 4 illustrates a method for generating data using a factorized variational autoencoder, according to an embodiment.

FIG. 4 illustrates a method 400 for generating data using a factorized variational autoencoder (after learning is performed), according to an embodiment. As shown, the method 400 begins at step 410, where an FVAE application determines properties of an object i, $U_i$, by drawing from a log-normal prior distribution. As described, the properties of the object $U_i$ may represent how much the object's reactions to stimuli are similar to various typical types of reactions.

At step 420, the FVAE application determines typical reactions to stimuli $V_t$ at a given time t by drawing from a Gaussian prior distribution.

At step 430, the FVAE application takes the Hadamard product $U_i \circ V_t$ of the determined properties of the object $U_i$ and the typical reactions to the stimuli $V_t$. This Hadamard product essentially encodes the input data into the lower-dimensional vector $z_{it}$ of latent variables.

At step 440, the FVAE application inputs the determined Hadamard product $U_i \circ V_t$ into the FVAE's decoder. As described, the decoder is a neural network that takes as inputs the latent variables $z_{it}$, which can be obtained through the Hadamard product $U_i \circ V_t$, and outputs object behaviors $x_{it}$. The decoder's parameters may be simultaneously optimized along with the variational parameters during training of the FVAE model. Once trained, such a decoder may be used at step 440 to generate object behaviors by inputting the Hadamard product determined at step 430.

Figure 5:
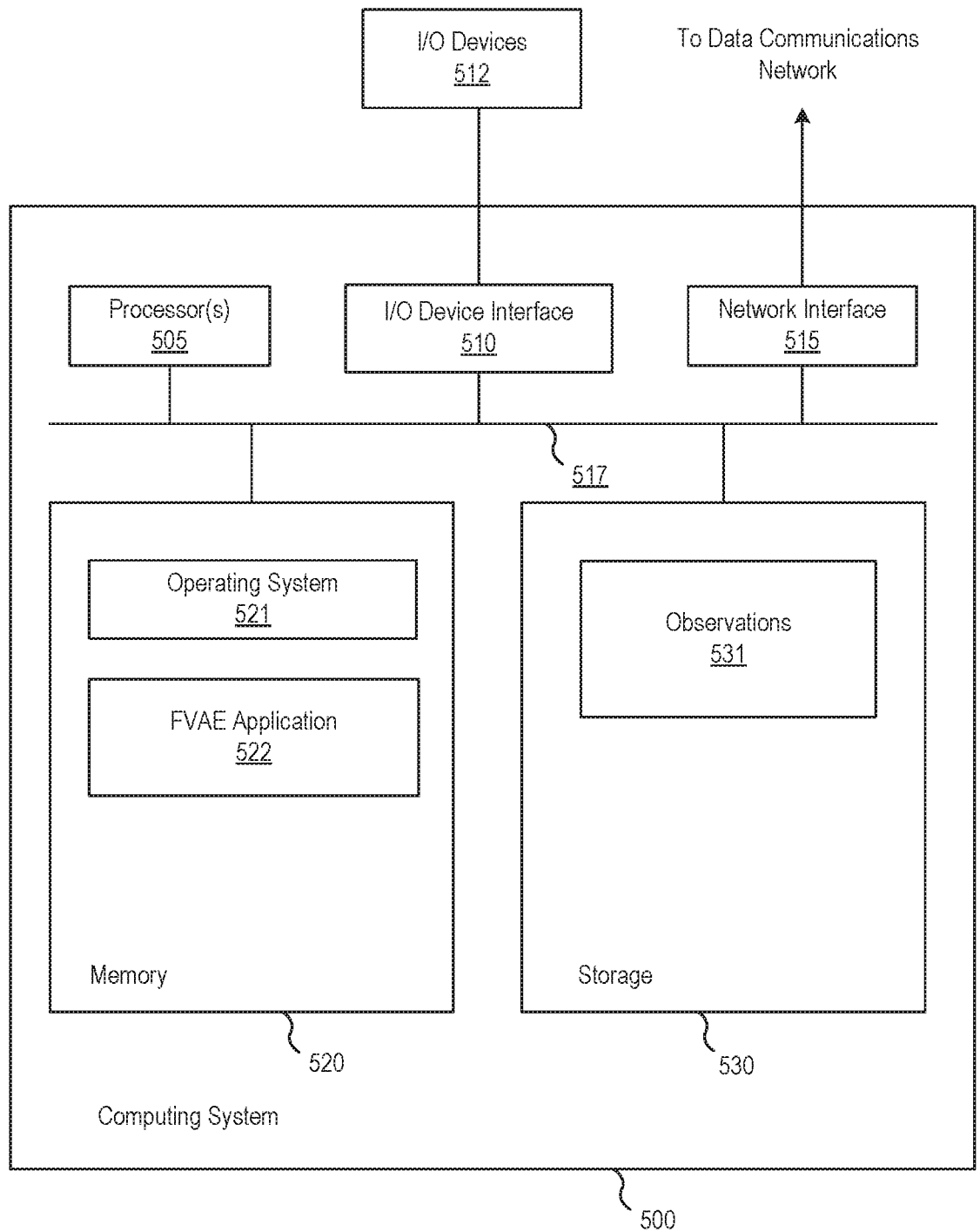
FIG. 5 illustrates a system in which an embodiment of this disclosure may be implemented.

FIG. 5 illustrates a system 500 in which an embodiment of this disclosure may be implemented. As shown, the system 500 includes, without limitation, processor(s) 505, a network interface 515 connecting the system to a network, an interconnect 517, a memory 520, and storage 530. The system 500 may also include an I/O device interface 510 connecting I/O devices 512 (e.g., keyboard, display and mouse devices) to the system 500.

The processor(s) 505 generally retrieve and execute programming instructions stored in the memory 520. Similarly, the processor(s) 505 may store and retrieve application data residing in the memory 520. The interconnect 517 facilitates transmission, such as of programming instructions and application data, between the processor(s) 505, I/O device interface 510, storage 530, network interface 515, and memory 520. Processor(s) 505 is included to be representative of general purpose processor(s) and optional special purpose processors for processing video data, audio data, or other types of data. For example, processor(s) 505 may include a single central processing unit (CPU), multiple CPUs, a single CPU having multiple processing cores, one or more graphical processing units (GPUS), one or more FPGA cards, or a combination of these. And the memory 520 is generally included to be representative of a random access memory. The storage 530 may be a disk drive storage device. Although shown as a single unit, the storage 530 may be a combination of fixed or removable storage devices, such as magnetic disk drives, flash drives, removable memory cards or optical storage, network attached storage (NAS), or a storage area-network (SAN). Further, system 500 is included to be representative of a physical computing system as well as virtual machine instances hosted on a set of underlying physical computing systems. Further still, although shown as a single computing system, one of ordinary skill in the art will recognized that the components of the system 500 shown in FIG. 5 may be distributed across multiple computing systems connected by a data communications network.

As shown, the memory 520 includes an operating system 521 and a factorized variational autoencoder application 522. The operating system 521 may be, e.g., Linux®. The FVAE application 522 is configured to learning latent representations of data and generate new data, among other things. In one embodiment, the FVAE application 522 may determine latent representations from raw data by receiving a data set of observations 531 of objects, detecting objects in the received data set and landmarks on the objects (or non-landmark data), and learning, from the detected objects and landmarks (or non-landmark data), a VAE that has a factorized representation, according to the method 300 described above with respect to FIG. 3. In addition, the FVAE application 522 may generate data using a FVAE by determining properties of an object by drawing from a log-normal prior distribution, determining typical reactions to stimuli at a given time by drawing from a Gaussian prior distribution, taking the Hadamard product of the determined properties of the object and the typical reactions to the stimuli, and inputting the determined Hadamard product into an FVAE decoder, according to the method 400 described above with respect to FIG. 4.

Although discussed herein primarily with respect to objects such as trees in a forest or audience members watching a movie, it should be understood that techniques disclosed herein may generally be used on any observed multi-dimensional temporal signals of multiple instances that are correlated, such as high-dimensional time series or multi-dimensional landmarks on crowds of people or players in a game. In these cases, each instance has a unique response but there may be a finite number of characteristic ways of behaving over time.

Advantageously, techniques disclosed herein provide a FVAE framework which may be used in unsupervised learning of latent representations, even when data does not decompose linearly as required by traditional matrix and tensor factorization techniques. This unsupervised learning approach does not require human annotators to train the FVAE model. Experience has shown that FVAEs can learn semantically meaningful representations that can capture a range of behaviors and are relatively easy to interpret and visualize. For example, a FVAE may be used as an unsupervised smiling and laughing detector that, without manual intervention, learns smiling and laughing patterns in videos of an audience viewing a movie or to learn in an unsupervised manner typical behaviors of a forest of trees in response to wind in a physical simulation. Like VAEs, FVAEs are also generative models that can be used to create new data resembling input data. Further, FVAEs may be more compact than conventional baselines, requiring fewer latent dimensions to achieve superior reconstruction of data. In addition, experience has shown that FVAEs may be used to accurately predict missing values and to anticipate behaviors based on a limited set of observations, such as predicting occluded audience members' reactions or predicting a reaction of a particular audience member to an entire movie from only a few minutes of observations of the audience member.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order or out of order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A computer-implemented method comprising:
receiving data indicating observations of a plurality of persons reacting to a first portion of a plurality of portions of a video, wherein the received data is unfactorizable;
learning, from the received data in an unsupervised manner, a variational autoencoder that compresses the received data into a lower-dimensional vector of latent factors by:

generating, for the plurality of persons, a first vector representing latent stimuli;
generating, for a first person of the plurality of persons, a second vector representing how the first person reacts to the latent stimuli;
generating the lower-dimensional vector of latent factors based on the first and second vectors; and
factorizing the lower-dimensional vector of latent factors; and
predicting, using the learned variational autoencoder, data separate from the received data, the predicted data indicating an unobserved reaction of the first person to at least a second portion of the plurality of portions of the video.

2. The method of claim 1, wherein learning the variational autoencoder comprises jointly learning a latent representation of each of the plurality of persons and a corresponding factorization across time and the plurality of persons.

3. The method of claim 1, wherein learning the variational autoencoder comprises using variational inference to learn an approximation to a Bayesian posterior distribution over hidden variables.

4. The method of claim 1, wherein learning the variational autoencoder comprises:
adding Gaussian noise when generating at least one of the first vector or the second vector; and
approximating latent variables using point estimates according to a maximum a posteriori (MAP) approximation.

5. The method of claim 1, wherein the received data includes landmarks on the plurality of persons detected in one or more video frames depicting the observations of the plurality of persons.

6. The method of claim 1, further comprising
inputting the lower-dimensional vector of latent factors into a decoder of the variational autoencoder, wherein properties of the first person are determined by drawing from a log-normal distribution, and wherein typical reactions to a stimulus at a given time are determined by drawing from a Gaussian prior distribution.

7. The method of claim 1, further comprising
inputting the lower-dimensional vector of latent factors into a decoder of the variational autoencoder, wherein the lower-dimensional vector of latent factors is based on a log-normal distribution and a Gaussian prior distribution.

8. The method of claim 1, further comprising
inputting the lower-dimensional vector of latent factors into a decoder of the variational autoencoder, wherein the lower-dimensional vector of latent factors is based on at least a subset of the received data indicating observations of the first person.

9. The method of claim 1, further comprising, clustering rows of a matrix corresponding to the plurality of persons resulting from factorization of an output of an encoder of the variational autoencoder.

10. The method of claim 9, further comprising, detecting one or more anomalies based on at least the clustering.

11. The method of claim 1, further comprising, training a supervised learning model using an output of an encoder of the variational autoencoder.

12. A non-transitory computer-readable storage medium storing a program, which, when executed by a processor performs operations comprising:

receiving data indicating observations of a plurality of persons reacting to a first portion of a plurality of portions of a video, wherein the received data is unfactorizable;
learning, from the received data in an unsupervised manner, a variational autoencoder that compresses the received data into a lower-dimensional vector of latent factors by:
generating, for the plurality of persons, a first vector representing latent stimuli;
generating, for a first person of the plurality of persons, a second vector representing how the first person reacts to the latent stimuli;
generating the lower-dimensional vector of latent factors based on the first and second vectors; and
factorizing the lower-dimensional vector of latent factors; and
predicting, using the learned variational autoencoder, data separate from the received data, the predicted data indicating an unobserved reaction of the first person to at least a second portion of the plurality of portions of the video.

13. The computer-readable storage medium of claim 12, wherein learning the variational autoencoder comprises jointly learning a latent representation of each of the plurality of persons and a corresponding factorization across time and the plurality of persons.

14. The computer-readable storage medium of claim 12, wherein learning the variational autoencoder comprises using variational inference to learn an approximation to a Bayesian posterior distribution over hidden variables.

15. The computer-readable storage medium of claim 12, wherein learning the variational autoencoder comprises:
adding Gaussian noise when generating at least one of the first vector or the second vector; and
approximating latent variables using point estimates according to a maximum a posteriori (MAP) approximation.

16. The computer-readable storage medium of claim 12, wherein the received data includes landmarks on the plurality of persons detected in one or more video frames depicting the observations of the plurality of persons.

17. The computer-readable storage medium of claim 12, the operations further comprising
inputting the lower-dimensional vector of latent factors into a decoder of the variational autoencoder, wherein properties of the first person are determined by drawing from a log-normal distribution, and wherein typical reactions to a stimulus at a given time are determined by drawing from a Gaussian prior distribution.

18. The computer-readable storage medium of claim 12, the operations further comprising inputting the lower-dimensional vector of latent factors into a decoder of the variational autoencoder, wherein the lower-dimensional vector of latent factors is based on a log-normal distribution and a Gaussian prior distribution.

19. The computer-readable storage medium of claim 12, the operations further comprising inputting the lower-dimensional vector of latent factors into a decoder of the variational autoencoder, wherein the lower-dimensional vector of latent factors is based on at least a subset of the received data indicating observations of the first person.

20. The computer-readable storage medium of claim 12, the operations further comprising, clustering rows of a matrix corresponding to the plurality of persons resulting from factorization of an output of an encoder of the variational autoencoder.

21. The computer-readable storage medium of claim 12, the operations further comprising, training a supervised learning model using an output of an encoder of the variational autoencoder.

22. A system, comprising:
a processor; and
a memory, wherein the memory includes a program configured to perform operations comprising:
receiving data indicating observations of a plurality of persons reacting to a first portion of a plurality of portions of a video, wherein the received data is unfactorizable;
learning, from the received data in an unsupervised manner, a variational autoencoder that compresses the received data into a lower-dimensional vector of latent factors by:
generating, for the plurality of persons, a first vector representing latent stimuli;
generating, for a first person of the plurality of persons, a second vector representing how the first person reacts to the latent stimuli;
generating the lower-dimensional vector of latent factors based on the first and second vectors; and
factorizing the lower-dimensional vector of latent factors; and
predicting, using the learned variational autoencoder, data separate from the received data, the predicted data indicating an unobserved reaction of the first person to at least a second portion of the plurality of portions of the video.

23. The computer-implemented method of claim 1, wherein the received data indicates observations of the plurality of persons reacting to the portion of the video during a same period of time, and wherein the at least the second portion of the plurality of portions of the video comprises an entirety of the video.

* * * * *

UNITED STATES PATENT AND TRADEMARK OFFICE
CERTIFICATE OF CORRECTION

| | |
|---|---|
| PATENT NO. | : 11,403,531 B2 |
| APPLICATION NO. | : 15/654529 |
| DATED | : August 2, 2022 |
| INVENTOR(S) | : G. Peter K. Carr et al. |

It is certified that error appears in the above-identified patent and that said Letters Patent is hereby corrected as shown below:

On the Title Page

In item (56), in Column 2, under "Other Publications", Line 2, delete "forthe" and insert -- for the --.

On the page 2, in item (56), in Column 2, under "Other Publications", Line 2, delete "Univiersity" and insert -- University --.

In the Specification

In Column 8, Line 9, delete "($\mu_A$" and insert -- ($\mu_\lambda$ --.

Signed and Sealed this
Sixth Day of June, 2023

Katherine Kelly Vidal
*Director of the United States Patent and Trademark Office*